United States Patent [19]

Maas, III et al.

[11] Patent Number: 5,850,486
[45] Date of Patent: Dec. 15, 1998

[54] REGISTRATION OF IMAGE DATA

[75] Inventors: Luis C. Maas, III, West Bloomfield, Mich.; Blaise deB. Frederick, Cambridge; Perry F. Renshaw, Arlington, both of Mass.

[73] Assignee: The McLean Hospital Corporation, Belmont, Mass.

[21] Appl. No.: 639,824

[22] Filed: Apr. 29, 1996

[51] Int. Cl.[6] .................. G06F 15/316; G06F 15/332; G06K 9/36; G06K 9/32
[52] U.S. Cl. .................. 382/294; 382/278; 382/280; 382/295; 382/296
[58] Field of Search .................. 382/278, 280, 382/294, 295, 296

[56] References Cited

U.S. PATENT DOCUMENTS

| | | | |
|---|---|---|---|
| 4,616,180 | 10/1986 | Compton | 324/309 |
| 4,730,620 | 3/1988 | Bailes | 128/653.2 |
| 4,761,613 | 8/1988 | Hinks | 324/309 |
| 4,937,526 | 6/1990 | Ehman et al. | 324/309 |
| 4,968,935 | 11/1990 | Ehman et al. | 324/309 |
| 5,005,578 | 4/1991 | Greer et al. | 128/653.2 |
| 5,035,244 | 7/1991 | Stokar | 128/653.2 |
| 5,113,137 | 5/1992 | Koizumi et al. | 324/307 |
| 5,115,812 | 5/1992 | Sano et al. | 128/653.2 |
| 5,243,284 | 9/1993 | Noll | 324/309 |
| 5,251,128 | 10/1993 | Crawford | 128/653.2 |
| 5,287,276 | 2/1994 | Crawford et al. | 378/4 |
| 5,323,110 | 6/1994 | Fielden et al. | 324/309 |
| 5,412,322 | 5/1995 | Wollin | 324/318 |
| 5,453,840 | 9/1995 | Parker et al. | 356/400 |
| 5,602,476 | 2/1997 | Liu et al. | 324/309 |

OTHER PUBLICATIONS

Cesmeli, et al., "An Automated Temporal Alignment Technique for the Translational and Rotational Correction of Digital Radiographic Images of Björk–Shiley Heart Valves, pp. 619–621, IEEE 1993".

Mosquera, et al., "Noise Behavior in Gridding Reconstruction", pp. 2281–2284, IEEE, 1995.

Apicella, et al., *Fast Multi–Modality Image Matching*, SPIE, vol. 1092 Medical Imaging III: Image Processing, pp. 252–263 (1989).

Cideciyan, et al., *Registration of High Resolution Images of the Retina*, SPIE, vol. 1652 Medical Imaging VI: Image Processing, pp. 310–322 (1992).

Fu, et al., *Orbital Navigator Echoes for Motion Measurements in Magnetic Resonance Imaging*, MRM, vol. 34, pp. 746–753 (1995).

Hajnal, et al., *Artifacts Due to Stimulus Correlated Motion in Functional Imaging of the Brain*, MRM, vol. 31, pp. 283–291 (1994).

Jackson, et al., *Selection of a Convolution Function for Fourier Inversion Using Gridding*, IEEE Transactions on Medical Imaging, vol. 10, No. 3, pp. 473–478 (Sep. 1991).

Pelizzari, et al., *Accurate Three–Dimensional Registration of CT, PET, and/or MR Images of the Brain*, Journal of Computer Assisted Tomography, vol. 13, No. 1, pp. 20–26 (Jan./Feb. 1989).

William K. Pratt, *Correlation Techniques of Image Registration*, IEEE Transactions on Aerospace and Electronic Systems, vol. AES–10(3), pp. 353–358 (May 1974).

Woods, et al., *Rapid Automated Algorithm for Aligning and Reslicing PET Images*, Journal of Computer Assisted Tomography, vol. 16, No. 4, pp. 620–633 (Jul./Aug. 1992).

*Primary Examiner*—Andrew W. Johns
*Assistant Examiner*—Daniel G. Mariam
*Attorney, Agent, or Firm*—Fish & Richardson P.C.

[57] ABSTRACT

Registration of images includes rotational and translation correction. Rotational correction includes estimating a rotational-correction angle by polar K-space cross-correlation. K-space regridding is used to rotate an image by the estimated correction angle. Translational correction is obtained by K-space phase-plane conjugation.

18 Claims, 5 Drawing Sheets

Microfiche Appendix Included
(1 Microfiche, 34 Pages)

REGISTRATION OF IMAGE DATA

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

MICROFICHE APPENDIX

A microfiche appendix of 1 sheet and 34 total frames containing source code listings is attached and incorporated herein by reference.

BACKGROUND OF THE INVENTION

The invention relates to registering multiple frames of two-dimensional image data.

Magnetic resonance imaging (MRI) is a widely-used diagnostic technique where radiofrequency (RF) signals are analyzed to produce diagnostic information. Echo-planar imaging (EPI) is a subset of MRI which provides high temporal resolution achieved with faster imaging techniques, and typically resulting in large image data sets. One application of EPI is functional magnetic resonance imaging (fMRI), where a time series of images are acquired for a selected plane (or planes) of a subject. In challenge-based fMRI of the human brain, a time series of images of one or more planes within a subject's brain are collected while the subject is exposed to a sequence of stimulus conditions, to identify functional changes in brain characteristics.

The high spatial resolution of EPI makes challenge-based experiments sensitive to subject movements on the scale of millimeters or less. Stimulus-correlated movements of the subject may lead to false results. The false information introduced by the subject's movement is commonly referred to as motion artifact. In order to analyze the time series of images, motion artifacts must be removed by registering the series of images. Proper inter-frame registration of the time series of images to remove motion artifact is particularly important in studies in which the subject's motion is an integral part of the experiment, such as experiments which require spoken responses or the performance of motor tasks.

Techniques used to register image sets include the use of physical immobilization devices to maintain the subject in a known position or the placement of external fiduciary markers as landmarks for post-processing alignment.

Approaches used after the image data is acquired include landmark matching, surface matching, brute force least-squares estimation, iterative least-squares estimation, and variations thereof. Landmark matching is a manual process which requires trained personnel to accurately identify landmarks in each image. Surface matching techniques may be computationally intensive when applied to large fMRI time series data. Also, various post-processing techniques construct the "registered" image by linear interpolation of the "misregistered" image, a technique which may introduce aliasing noise and high-spatial-frequency attenuation into the final corrected image.

SUMMARY OF THE INVENTION

A first image is registered with a second image by estimating a correction angle to rotationally align the first image with the second image, and rotating the first image by the estimated correction angle. In one embodiment, estimating includes converting the first and second images from image-space to K-space polar coordinates. The K-space magnitude data of the first image and second image are cross-correlated with respect to the polar angle axis. The offset of the maximum of the cross-correlation serves as the estimated correction angle. Additionally, the first and second images may be zero-padded prior to converting to K-space.

Converting the images from image-space into K-space includes transforming the first and second images into K-space by two-dimensional Fourier transformation. The power spectra of the transformed first and second image are computed. The power spectra are transformed to polar coordinates in K-space. In one embodiment, the transformed second image is rotated by an offset angle prior to computing the power spectra. Further, the power spectra data may be converted to a logarithmic scale after transforming to polar coordinates.

The first image is rotated by K-space regridding by the estimated correction angle. Image intensity variation is corrected.

Additionally, the rotationally-aligned first image may be translationally aligned with the second image. Translational alignment includes Fourier transforming the first and second images and computing the cross-power spectrum of the transformed first and second images. The first image is translationally aligned by phase-plane conjugation using a least-squares fitting method. In one embodiment, phase-plane conjugation includes estimating a first correction using a first sample along each frequency axis of the transformed images, and estimating a second correction using the first two samples along each axis of the transformed images.

Additionally, an apparatus for registering a first image with a second image is provided. The apparatus includes an input for receiving image data representing the first and second images. Also included is data storage for storing the image data, operably connected with the input. A processor, operably connected with the input and data storage, estimates a correction angle to rotationally align the first image with the second image and rotates the first image by the correction angle. Additionally, the processor translates the rotationally-aligned first image to align with the second image. The apparatus may also be coupled with an MRI apparatus for acquiring the images.

The present invention provides an automated, one-pass, inter-frame image registration system that achieves computational efficiency by decoupling rotational and translational correction. This approach reduces complexity, provides for the application of faster correction techniques, and eliminates the need for iterative methods. Additionally, image degradation is greatly reduced as compared to linear interpolation. The present invention can be used to register a wide variety of image data including MRI, CT, X-ray, and traditional photography, and any two-dimensional data set subject to planar rigid body motion. Other advantages and features will become apparent from the following description and claims.

DESCRIPTION OF THE PREFERRED EMBODIMENTS

Figure 1:
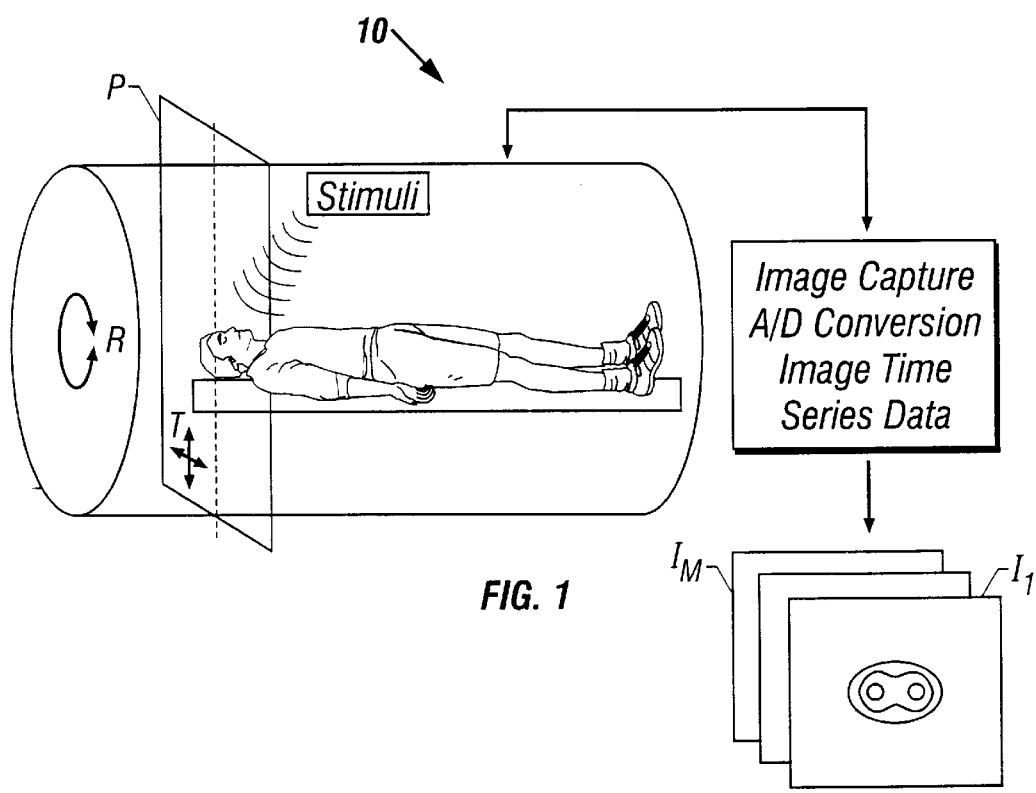
FIG. 1 depicts an example of the collection of fMRI time series data.

Image time series data refers to a sequence of two-dimensional images captured over time. In one embodiment, the time period between images is relatively short, e.g., one second or less. In another embodiment, the time period may be years, as in aerial photography of a section of land. The images may be of an animate or inanimate subject.

One example of an image is a cross-sectional image or slice of a human brain. The image data is the stored information that represents the image. The image data can be an analog hard copy, e.g., an X-ray negative or traditional photographic print. Also, the image data can be stored in an electronic format and displayed on a monitor. The image data can be converted from hard copy to electronic format, and electronic format to hard copy, by known techniques.

In fMRI, image time series data is processed to identify and analyze changes in the image which occur over time and/or in response to external stimuli. There are three basic steps for processing image time series data: (1) obtain the raw time series image data; (2) register or align the time series image data; and (3) process the registered time series image data. The present invention relates to step (2), registration of the time series image data. Without registration step (2), processing step (3) may not provide useful, reliable information because of movement of the subject in step (1).

Registration refers to correction of inter-frame rotational and translational motion of the imaged subject (or motion of the image capturing device). Registration is used to provide a time series of images which can be processed to identify and analyze changes in the image caused by factors other than inter-frame motion, or to line-up the images for other purposes. The present invention does not address out-of-plane motion.

The correction of in-plane, inter-frame motion is simplified by separating correction into two steps: (a) the correction of rotation, and (b) the correction of translation. Dividing the correction problem into two steps reduces the overall complexity of registration. Faster techniques are used to perform each correction step than is possible for performing rotational and translational correction together. Also, the need for iterative techniques is eliminated.

The ability to separate inter-frame motion into two parts is derived from the relationship between rotations and translations in the real image-space, and their respective transformations within K-space. The real image-space and K-space are uniquely related by Fourier transformation. A rotation about the center of image-space maps to an equivalent rotation about the center of K-space, while a linear translation in image-space maps to phase changes in K-space. Since any combination of image rotations and linear translations are geometrically equivalent to a single linear translation and a rotation about the center of the image, rotations can be considered separately, i.e., decoupled from translations, by examining only K-space magnitude data or the power spectrum. Therefore, the effects of linear translations, which are encoded in the phases, are eliminated from rotational correction.

Decoupling rotation from translation shifts the center of rotation of the power spectrum to the center of K-space, regardless of the actual rotation center in imagespace, and provides a means of "centering" the image for more rapid analysis. The estimation of rotation is reduced to a linear problem by recoding the power spectrum from Cartesian to polar coordinates. This transformation maps rotation about the center of K-space to a linear shift along the angle "axis" in polar coordinates. The angle of rotation from a first or "test" image to a second or "reference" image is then estimated by finding the wrapped angular shift which achieves the best match of the two polar power spectra. Computing the wrapped, i.e., periodic, cross-correlation of the two polar spectra for each angular shift quantifies this match, with the shift value at the maximum cross-correlation serving as the estimate of the angle of rotation.

Once the angle of rotation between a test and reference image is known, the test image is rotated to match the orientation of the reference image, leaving only a linear translation between the reference and rotated test image. Rotating the test image is achieved by K-space regridding, which reduces high frequency attenuation and aliasing noise as compared to linear interpolation.

Once the rotational correction is made, correction for linear translation between the test and reference images is performed. The shift property of the Fourier transformation, i.e., the shift along any spatial axis introduces a linear phase shift in the direction of the corresponding frequency axis, is used for translational correction. Symbolically:

if $d(x,y) \Leftrightarrow D(k_x,k_y)$, then $d(x-\Delta x, y-\Delta y) \Leftrightarrow \exp\{-i(k_x \Delta x + k_y \Delta y)\} \cdot D(k_x,k_y)$ where x and y are spatial coordinates, $k_x$ and $k_y$ are spatial frequencies, $\Delta x$ and $\Delta y$ are the linear displacements in image space, d is the image, D is the Fourier transformation of the image, and the bi-directional arrows indicate Fourier transformation pairs.

By computing the cross-power spectrum of the two oriented (but shifted) images, the phase information associated with the images cancels, leaving only the phase associated with the shift. Symbolically:

$$\begin{aligned} CPS &= D \cdot [\exp\{-i(k_x \Delta x + k_y \Delta y)\} \cdot D]^* \\ &= \{D \cdot D^*\} \cdot \exp\{i(k_x \Delta x + k_y \Delta y)\} \\ &= |D|^2 \cdot \exp\{i(k_x \Delta x + k_y \Delta y)\} \end{aligned}$$

$$\angle CPS = \Delta x \cdot k_x + \Delta y \cdot k_y,$$

where CPS is the cross-power spectrum, the asterisk indicates complex conjugation, the vertical bars indicate magnitude, the angle sign indicates the phase angle, and D, $k_x$, $k_y$, $\Delta x$, and $\Delta y$ are defined as above.

The phase angle of the cross-power spectrum thus defines a "phase plane" in $k_x$ and $k_y$ with coefficients equal to the displacements $\Delta x$ and $\Delta y$ along each image axis. These coefficients are estimated by fitting a plane using a least-squares method, and they are then used to calculate a reciprocal exponential, i.e., a complex exponential with a phase-plane which is the conjugate of that fit to the data. The K-space samples of the shifted image are multiplied by this exponential, and Fourier transformation then yields the final registered image.

The plane-fitting system does not require integer values for the shift coefficients $\Delta x$ and $\Delta y$; therefore, it permits the correction of sub-pixel shifts. The sequential correction of translation is referred to as phase-plane conjugation.

In one embodiment, decoupled, automated rotational and translational registration of image data is provided for fMRI times series data. obtaining the raw fMRI time series data is achieved by known techniques using commercially available equipment. For EPI, a General Electric (GE) Signa 1.5 Tesla Magnetic Resonance Scanner (made by GE Medical Systems, Milwaukee, Wis.) is retrofit with an InstaScan® resonating whole body gradient set from Advanced NMR Systems, Inc. Other MRI models are also sold by GE, and other manufacturers of MRI scanners include Phillips, Siemens, and Toshiba.

FIG. 1 provides an example of the operation of a system for acquiring the fMRI time series data. A patient is initially positioned in MRI scanner 10. Conventional MRI images are used to define an image plane P (or planes) of interest. A sequence of M echo-planar images I per plane are captured, where M is typically 256 or 128, but could be any number. With a repetition time of about one second, it usually takes about four and one-half minutes to obtain 256 echo-planar images. MRI scanner 10 processes the M images ($I_1$ to $I_M$), converting each of the M two-dimensional K-space images from an analog signal to digital image data. The raw image time series data ($I_1$ to $I_M$) is then available for viewing or further processing.

Generally, the patient will not remain completely motionless during the imaging period. In fMRI, the patient is often subjected to one or more stimuli, such as a flashing light, which increases the likelihood that the patient will move. Therefore, there is a high probability that motion artifacts are introduced into the M images. Rotational and translational motion are shown in FIG. 1 by arrows R and T, respectively. EPI images are high resolution, and subject motion of as little as 0.2 mm can introduce motion artifacts into the image time series data. The motion artifacts, if not corrected, corrupt the temporal correlation between the stimulus and image, leading to inaccurate and unreliable results.

The MRI scanner generates the raw image data. Each image $I_A$, where A=1, . . . , M, may be stored as digital information in an N-by-N square array of 16-bit unsigned integers, where N is typically 128 or 64. Thus, the time series image data consists of an array of N-by-N-by-M 16-bit unsigned integers. The image dimensions need not be square, and the dimensions may be varied depending on the particular application.

Depending on the particular MRI scanner, other data formats may also be used. The MRI scanner image data format typically is not suitable for the registration processing described below. Therefore, the MRI scanner image data format (e.g., 16-bit unsigned integers) is converted into a square array of 32-bit floating point numbers by known techniques.

A reference image $I^{Ref}$ to which all images $I_A$ are aligned is selected. The. first, last, or any other image I can be selected as $I^{Ref}$. Using the middle image, $I_{M/2}$ as $I_{Ref}$ (e.g., image 128 of 256), provides several benefits, including the reduction in error by out-of-plane motion. Also, for any motion of the patient that has a linear component, the selection of the middle image provides a symmetrical correction to the ends.

Figure 2:
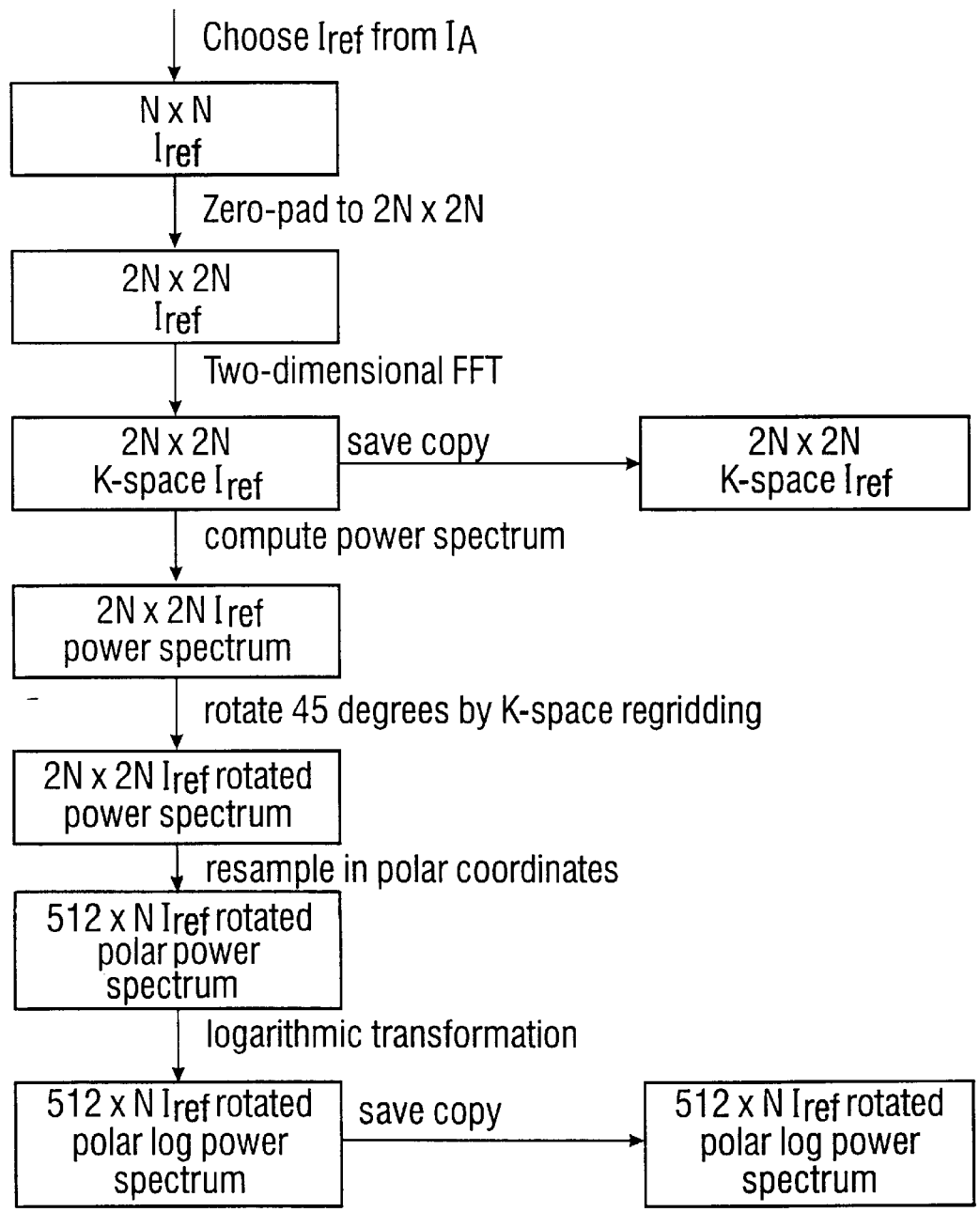
FIG. 2 is a flow chart of reference image processing.

FIG. 2 provides a flow diagram of processing $I_{Ref}$. $I_{Ref}$ is zero-padded to double the dimensions from N-by-N to 2N-by-2N. The 2N-by-2N $I_{Ref}$ is converted to K-space by two-dimensional fast Fourier transformation (FFT). A copy of the transformed 2N-by-2N $I_{Ref}$ is saved for later use. Next, the power spectrum is computed. The phase information, which contains the information relating to translation, is discarded by computing the power spectrum.

For small inter-frame rotation angles, correlation in the aliasing energy introduced by polar recoding of the images can bias correlation estimates. To disrupt the aliasing correlation and maintain sensitivity to small rotations, $I_{Ref}$ may be rotated by an offset angle, e.g., 45 degrees, using the K-space regridding technique discussed below.

The 2N-by-2N K-space $I_{Ref}$ is converted from Cartesian to polar coordinates. The polar coordinate transformation is accomplished by polar resampling after convolution in K-space with a circularly symmetric 5.1 sample-wide Hamming window. The convolution is performed only at the resampling points.

The polar conversion produces N radial points by 512 polar angle points, for an effective angular resolution of 0.352 degrees. The value, 512, is an operating parameter and can be adjusted up or down for obtaining greater or lesser angular resolution. Also, since the original image-space data is purely real, the power spectrum has half-plane symmetry. Therefore, recoding only half of the plane is required, effectively doubling the angular sampling rate. Although N radial points is an operating parameter in the conversion to polar coordinates, only the center N/2 radial points or rings (i.e., N/4 to 3N/4) need be computed. The polar conversion technique interpolates values for polar coordinates lying between the Cartesian points.

To increase the contribution of higher frequencies, the power spectrum is converted to a logarithmic scale. However, logarithmic scale conversion is not required.

The polar data representing $I_{Ref}$ is stored for further processing as described below.

Each image $I_A$ is now registered with $I_{Ref}$ by sequentially performing rotation and translation correction for each image $I_A$. Registration of $I_{Ref}$ with itself is performed in the normal sequence of images to validate the choice of operating parameters.

Figure 3:
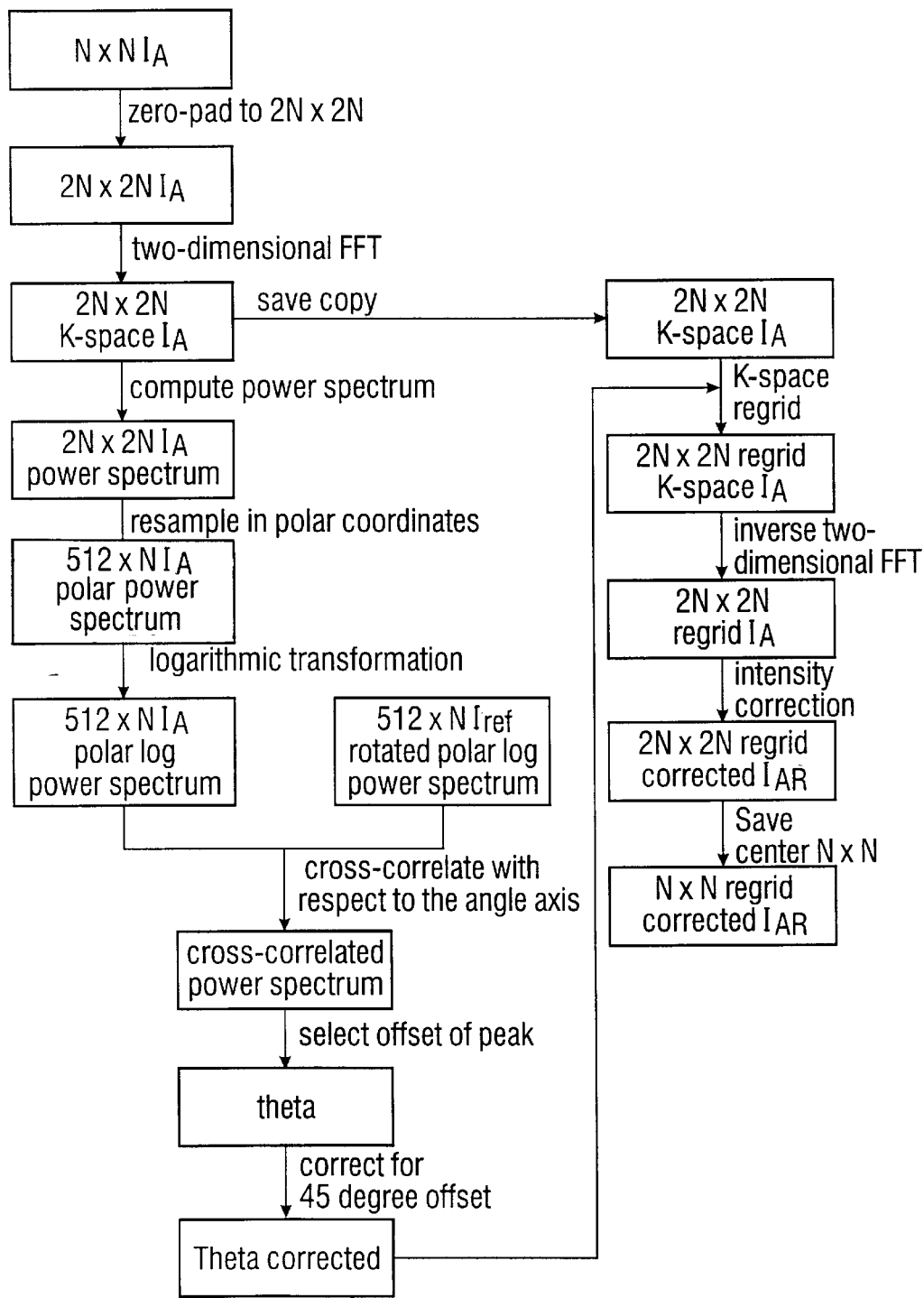
FIG. 3 is a flow chart of rotational correction.

FIG. 3 provides a flow chart of rotational correction. The N-by-N $I_A$ is first zero-padded to generate a 2N-by-2N A. The 2N-by-2N $I_A$ is converted to K-space by two-dimensional FFT. A copy of the transformed 2N-by-2N $I_A$ is saved for later use.

Next, the power spectrum is computed. The power spectrum is then converted to polar coordinates. This conversion from image-space to K-space polar coordinates is the same for each $I_A$ as for $I_{Ref}$, with the exception that $I_A$ is not rotated by an offset angle. The polar power spectrum is converted to a logarithmic scale. (Once again, the logarithmic scale conversion is optional, and $I_A$ is converted to a logarithmic scale only when the $I_{Ref}$ is also converted to a logarithmic scale.)

To find the estimated correction angle, circular cross-correlation for each of the central N/2 radii with the corresponding reference radii is performed by Fourier methods. The cross-correlations from each radius are averaged. The peak or maximum offset of the composite cross-correlation is identified by linear search. The peak offset determines the polar angle θ which represents the offset of $I_A$ with respect to $I_{Ref}$ of θ degrees. θ is then corrected for the offset angle adjustment of $I_{Ref}$ discussed above.

$I_A$ is corrected by θ using K-space regridding. The K-space matrix of the zero-padded 2N-by-2N $I_A$ saved above, is convolved by a circularly symmetric 5.1 sample-wide Hamming window. Once again, this step fills in the old grid in order to assign values to the new grid points, which may not coincide with the original points.

The regridded K-space $I_A$ (i.e., the rotationally-corrected 2N-by-2N $I_A$) is now converted back to image-space by two-dimensional inverse FFT, leaving a 2N-by-2N image-space $I_A$. Image-intensity variation is corrected in a process known as "undoming". The data values that make up $I_A$ are divided by the mainlobe values of the Hamming window used in the resampling convolution.

The desired image is found in the central N-by-N image data and the remaining data is discarded. The rotationally-corrected image, now designated $I_{AR}$, has the same dimensions, resolution, and orientation as $I_{Ref}$. However, $I_{AR}$ still may have a translation shift.

Figure 4:
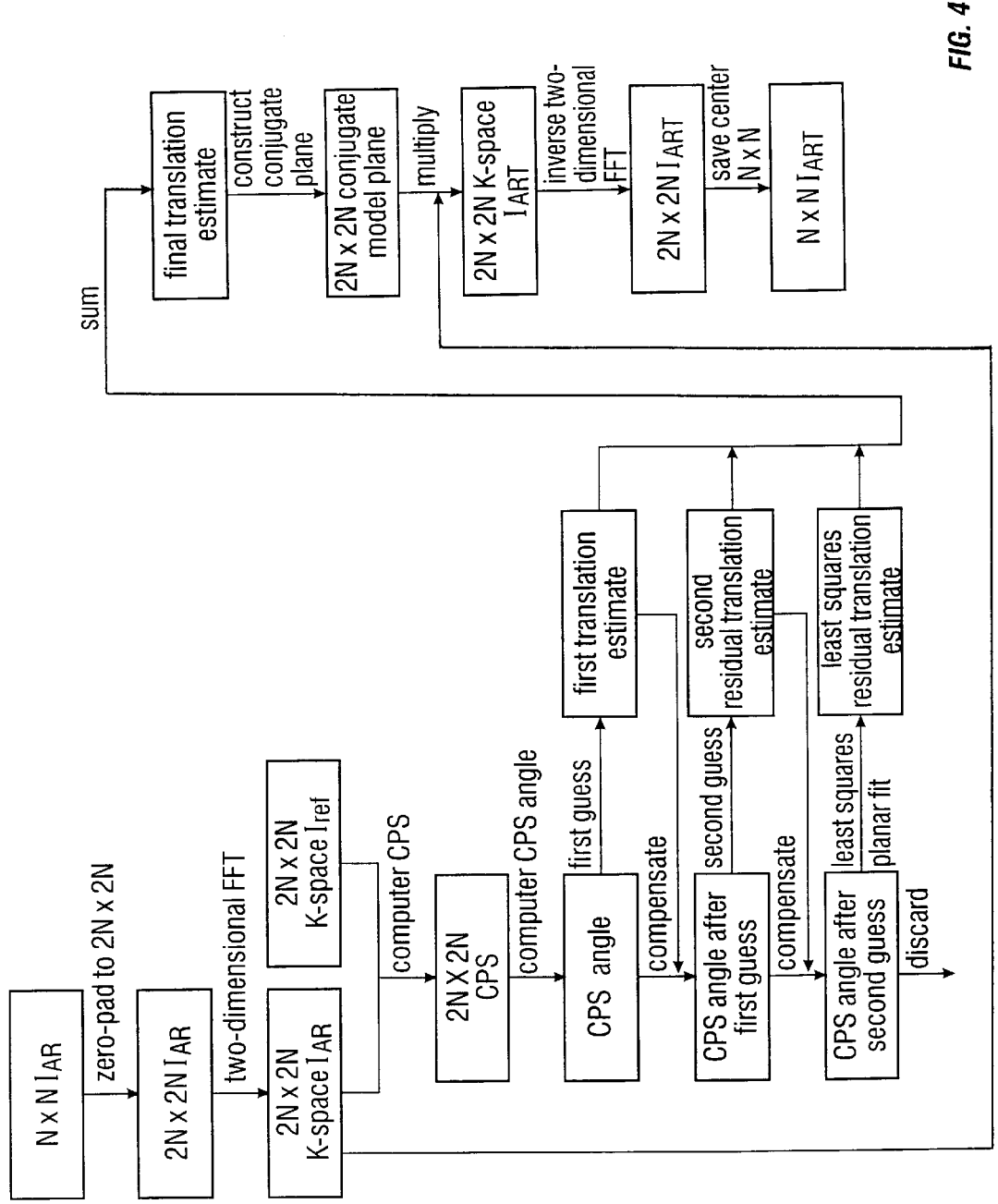
FIG. 4 is a flow chart of translational correction.

FIG. 4 provides a flow chart of the translational correction. First, the N-by-N, rotationally-corrected $I_{AR}$ is zero-padded and converted to K-space by two-dimensional fast Fourier transformation. The cross-power spectrum of $I_{AR}$ and $I^{Ref}$ is computed by conjugate multiplication of the K-space samples, and the phase is computed with the arctangent function as needed.

To allow for larger translational displacements, which may result in phase wrapping, an automated first guess for $\Delta x$ and $\Delta y$ displacements is made using only the first K-space sample along each frequency axis, followed by a second guess including the remodulated first and second samples equally weighted. The first guess is a rough estimate that provides great certainty that there will be no phase jump between the first and second points, i.e., no wrapping problem. The second guess generally provides accuracy within one pixel so that the entire data set can now be used without the danger of phase wraps corrupting the final fit.

After both the first and second guesses, the cross-power spectrum is appropriately remodulated, and the final correction estimate is made by phase-plane estimation, with parameters computed by the least-squares method. To reduce noise effects during fitting, each frequency is weighted by its cross-power spectrum magnitude. The least-squares fit is performed over the lowest half of frequencies, allowing for a residual motion of up to $\sqrt{2}$ pixels in any direction before phase-wrapping occurs. The final linear displacement parameters are computed from the initial guesses and the planar fit, and are used to define the conjugate model plane for phase-plane conjugation.

After each K-space value of $I_{AR}$ is appropriately multiplied, the 2N-by-2N K-space image, now designated $I_{ART}$ is transformed back to image-space by two-dimensional inverse FFT. Once again, the desired image is the central N-by-N array, and the remaining outer data is discarded.

The rotational and translational corrections are performed sequentially for each image $I_A$ from 1 to M. The time series image data is now registered and ready for further analysis.

Registration of multiple frames of image data to remove motion artifacts is also useful for other types of two-dimensional image data sets, including computed tomography, X-ray, and traditional photography images. In fact, registration can be used to remove motion artifacts from any two-dimensional data set subject to planar rigid body motion. The motion can be either "true" motion or shifting of the subject, or motion of the image capturing device.

Figure 5:
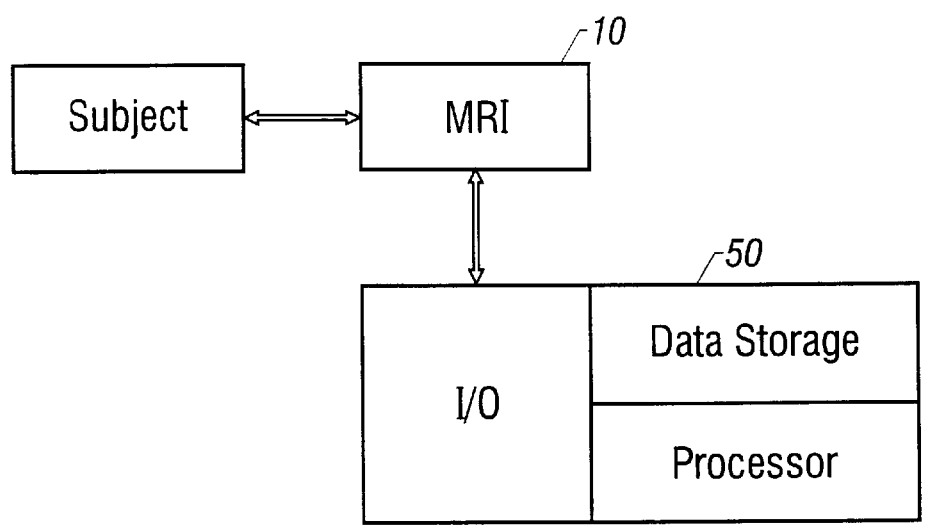
FIG. 5 is a block diagram of a registration system.

A registration system is shown in FIG. 5. As discussed above, MRI scanner 10 acquires the images and converts the information to image data. The time series image data is then transferred to registration system 50, which includes an input/output port 51, data storage 52, and processor 53. Processor 53 is programmed to perform the computations described above in order to make the rotational and translational corrections. Data storage 52 can be any suitable data storage device, including magnetic tape, magnetic disk, or semiconductor memory. Input/output port 51 is of known design and capable of communicating with other devices by various known protocols.

In one embodiment, registration system 50 includes a DEC 5000/240 workstation running the Ultrix 4.3 UNIX operating system. Software suitable to run on the DEC workstation and perform the required computations is attached as the microfiche appendix. The software is written in the C programming language. Other embodiments include an HP 9000/735/125 workstation running HP-UX 9.05, and a Sun SPARC 10 running SunOS 4.1.3.

Other embodiments are within the scope of the following claims.

What is claimed is:

1. A method of rotationally aligning a first image with a second image, wherein the first and second images comprise values that are uniformly spaced on a Cartesian grid, the method comprising:

estimating a correction angle to rotationally align the first image with the second image; and rotating the first image by the estimated correction angle by using a regridding technique, wherein the regridding technique comprises:

converting the first image from image space to k-space;

sampling a convolution of the k-space image and a filter function at coordinates that when rotated by the estimated correction angle map onto a k-space Cartesian grid;

assigning values to the k-space Cartesian grid based on the sampled convolution to produce a rotated k-space image; and converting the rotated k-space image into image space to produce the rotated first image.

2. The method of claim 1, wherein converting the rotated k-space image comprises dividing an inverse Fourier transform of the rotated k-space image by an inverse Fourier transform of the k-space Cartesian values of the filter function to produce the rotated first image.

3. The method of claim 1, wherein the filter function is a circularly-symmetric Hamming window.

4. The method of claim 1, wherein the estimating step comprises:

converting the first and second images into first and second k-space polar images;

cross-correlating at least a portion of the first k-space polar image with a corresponding portion of the second k-space polar image along the polar angle axis; and determining the correction angle from the cross-correlation.

5. The method of claim 4, wherein the portions of the k-space polar images are the values at intermediate k-space radii.

6. The method of claim 4, wherein the converting step comprises:

Fourier transforming the first and second images;

computing power spectra of the transformed images; and sampling a convolution of each power spectrum with a common filter function at polar coordinates to produce the k-space polar images.

7. The method of claim 4, wherein the k-space polar images are determined from logarithms of power spectra of the Fourier transforms of the first and second images.

8. A method of registering a first image with a second image, the method comprising:

rotationally aligning the first and second images according to the method of claim 1; and translationally aligning the rotated first image with the second image.

9. A method of translationally aligning a first image with a second image, the method comprising:

Fourier transforming the first and second images into k-space to produce first and second k-space images;

computing a cross-power spectrum of the first and the second images by multiplying the Fourier transform of the first image by the complex conjugate of the Fourier transform of the second image, the cross-power spectrum having a phase profile;

fitting the phase profile of the cross-power spectrum to a k-space phase-plane;

multiplying the first k-space image by a k-space phase-plane that is a conjugate of the fitted k-space phase-plane; and inverse Fourier transforming the multiplied k-space image to translationally align the first image with the second image.

10. The method of claim 9, wherein the fitting step comprises performing a least squares regression on the phase values of the cross-power spectrum.

11. The method of claim 10, wherein the phase values of the cross-power spectrum are weighted by the magnitude values of the cross-power spectrum during the least squares regression.

12. A method of registering a first image with a second image, comprising:

translationally aligning the first and second images according to the method of claim 9; and rotationally aligning the first image with the second image.

13. Apparatus comprising a computer readable medium storing a program that causes a processor to perform the steps of claim 1.

14. Apparatus comprising a computer readable medium storing a program that causes a processor to perform the steps of claim 2.

15. Apparatus comprising a computer readable medium storing a program that causes a processor to perform the steps of claim 9.

16. A system for processing a series of images, the system comprising:

an input port for receiving the series of images;

an data storage device, operably coupled with the input port, for storing the images; and a processor, operably coupled with the input port and data storage device, for registering the images;

wherein the processor performs the steps of claim 1.

17. A system for processing a series of images, the system comprising:

an input port for receiving the series of images;

an data storage device, operably coupled with the input port, for storing the images; and a processor, operably coupled with the input port and data storage device, for registering the images;

wherein the processor performs the steps of claim 2.

18. A system for processing a series of images, the system comprising:

an input port for receiving the series of images;

an data storage device, operably coupled with the input port, for storing the images; and a processor, operably coupled with the input port and data storage device, for registering the images;

wherein the processor performs the steps of claim 9.

* * * * *